United States Patent
Kim et al.

(10) Patent No.: US 8,019,982 B2
(45) Date of Patent: Sep. 13, 2011

(54) LOOP DATA PROCESSING SYSTEM AND METHOD FOR DIVIDING A LOOP INTO PHASES

(75) Inventors: Hong-seok Kim, Seongnam-si (KR); Suk-jin Kim, Seoul (KR); Jeong-wook Kim, Seongnam-si (KR); Soo-jung Ryu, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

(21) Appl. No.: 11/542,118

(22) Filed: Oct. 4, 2006

(65) Prior Publication Data

US 2007/0094485 A1 Apr. 26, 2007

(30) Foreign Application Priority Data

Oct. 21, 2005 (KR) ........................ 10-2005-0099901

(51) Int. Cl.
*G06F 9/30* (2006.01)
(52) U.S. Cl. ........................................................ 712/241
(58) Field of Classification Search .................... 712/241
See application file for complete search history.

(56) References Cited

U.S. PATENT DOCUMENTS

| | | | | |
|---|---|---|---|---|
| 5,121,502 A * | 6/1992 | Rau et al. | | 712/24 |
| 5,574,939 A * | 11/1996 | Keckler et al. | | 712/24 |
| 6,374,403 B1 * | 4/2002 | Darte et al. | | 717/161 |
| 6,438,747 B1 * | 8/2002 | Schreiber et al. | | 717/160 |
| 6,507,947 B1 * | 1/2003 | Schreiber et al. | | 717/160 |
| 6,567,895 B2 * | 5/2003 | Scales | | 711/140 |
| 6,772,355 B2 * | 8/2004 | Homewood et al. | | 713/320 |
| 7,086,038 B2 * | 8/2006 | Cronquist et al. | | 717/136 |
| 2002/0087900 A1 * | 7/2002 | Homewood et al. | | 713/320 |
| 2002/0120923 A1 * | 8/2002 | Granston et al. | | 717/160 |
| 2002/0138718 A1 * | 9/2002 | Schlansker et al. | | 712/241 |
| 2003/0093771 A1 * | 5/2003 | Ogawa et al. | | 717/125 |
| 2003/0120882 A1 * | 6/2003 | Granston et al. | | 711/169 |
| 2003/0120899 A1 * | 6/2003 | Stotzer et al. | | 712/214 |
| 2003/0120900 A1 * | 6/2003 | Stotzer et al. | | 712/215 |
| 2003/0120905 A1 * | 6/2003 | Stotzer et al. | | 712/241 |
| 2003/0154469 A1 * | 8/2003 | Anderson et al. | | 717/161 |
| 2003/0182511 A1 * | 9/2003 | Asal et al. | | 711/125 |
| 2004/0103263 A1 * | 5/2004 | Colavin et al. | | 712/15 |
| 2004/0221283 A1 * | 11/2004 | Worley | | 717/160 |
| 2005/0039167 A1 * | 2/2005 | Fernandes et al. | | 717/116 |
| 2005/0060711 A1 * | 3/2005 | Ericsson et al. | | 718/107 |
| 2006/0184779 A1 * | 8/2006 | Pisek et al. | | 712/241 |

OTHER PUBLICATIONS

Free On-line Dictionary of Computing, "execution", © 1996 www.foldoc.org: search term "execution".*

* cited by examiner

*Primary Examiner* — Aimee J Li
(74) *Attorney, Agent, or Firm* — Sughrue Mion, PLLC

(57) ABSTRACT

A data processing system and method. The data processing system includes a processor core that executes a program; a loop accelerator that has an array consisting of a plurality of data processing cells and executes a loop in a program by configuring the array according to a set of configuration bits; and a centralized register file which allows data used in the program execution to be shared by the processor core and the loop accelerator. The loop accelerator divides the configuration of the array into at least three phases according to whether data exchange with the central register file is conducted during the loop execution. Thus, unnecessary occupation of the routing resource, which is used for the data exchange between the loop accelerator and the central register file during the loop execution, can be avoided.

10 Claims, 6 Drawing Sheets

LOOP DATA PROCESSING SYSTEM AND METHOD FOR DIVIDING A LOOP INTO PHASES

CROSS-REFERENCE TO RELATED APPLICATIONS

This application claims priority under 35 U.S.C. §119 (a) from Korean Patent Application No. 10-2005-0099901 filed on Oct. 21, 2005 in the Korean Intellectual Property Office, the entire disclosure of which is incorporated herein by reference.

BACKGROUND OF THE INVENTION

1. Field of the Invention

Systems and methods consistent with the present invention broadly relate to data processing. More particularly, the present invention relates to a data processing system and method for executing a loop by dividing a loop contained in a program into at least three phases based on whether data are exchanged between a loop accelerator and a central register file and differently configuring an array of the loop accelerator for the respective loop phases.

2. Description of the Related Art

FIG. 1 depicts a conventional data processing system.

The conventional data processing system 10 includes a processor core 11, a central register file 12, and a loop accelerator 13. Typically, the conventional data processing system 10 controls the loop accelerator 13 to promptly execute a loop in a program and controls the processor core 11 to execute other tasks of the program. In this case, the loop accelerator 13 and the processor core 11 may be configured to transfer data to each other by sharing the central register file 12.

The conventional loop accelerator 13 processes data by differently configuring an array 13a which consists of a plurality of data processing cells C11 through C34, according to a set of configuration bits corresponding to a currently executed loop amongst sets of configuration bits stored in a configuration memory 13b. The configuration of the array 13a is mainly adapted such that it does not change during the executing of one loop. Even when the configuration of the array 13a is altered during the execution of one loop, no consideration is given at all to the change of the configuration of the array 13a based on whether the data are exchanged between the central register file 12 and the loop accelerator 13.

In such a conventional data processing method, in order to access the central register file 12 and route live-in values or loop invariant values read from registers R3 and R4 to the data processing cells C22 and C14 which require the values, the loop accelerator 13, as shown in FIG. 1, constantly occupies the data processing cells C13 and C23 as routing resource of the live-in values or the loop invariants throughout the loop execution. Likewise, to deliver a live-out value from the data processing cell C32 to the register R1 of the central register file 12, the loop accelerator 13 constantly occupies the data processing cells C11 and C12 as the routing resource throughout the loop execution.

As such, even when it is not necessary to deliver the live-in and live-out values between the central register file 12 and the loop accelerator 13, the routing resource is occupied unnecessarily. This results in congestion and in limiting applications which use the loop accelerator 13. Therefore, the performance of the data processing system is degraded.

SUMMARY OF THE INVENTION

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

One aspect of the present invention is to provide a data processing system and method for reducing unnecessary occupation of a routing resource used to exchange data between a loop accelerator and a central register file by dividing a loop contained in a program into at least three phases based on whether the data exchange is conducted between the loop accelerator and the central register file, and executing the loop with differentiated configuration of an array of the loop accelerator for each loop phase.

Another aspect of the present invention is to provide a data processing system, which includes a processor core that executes a program; a loop accelerator which has an array consisting of a plurality of data processing cells and executes a loop in a program by configuring the array according to a set of configuration bits; and a centralized register file which allows data used in the program execution to be shared by the processor core and the loop accelerator. The loop accelerator divides the configuration of the array into at least three phases according to whether data exchange with the central register file is conducted during the loop execution.

The at least three phases may include a first phase which fetches data for the loop execution from the central register file, a second phase which executes the loop using the fetched data, and a third phase which writes data obtained through the loop execution to the central register file.

The loop accelerator may release the central register file from the processor core at the second phase.

The loop accelerator may include a configuration memory which stores at least three sets of configuration bits for configuring the array according to the at least three phases.

The at least three sets of configuration bits may include a first set of configuration bits for configuring the array to execute the first phase, a second set of configuration bits for configuring the array to execute the second phase, and a third set of configuration bits for configuring the array to execute the third phase.

The plurality of data processing cells each may include a distributed register file which stores data used during the loop execution; and a function unit which performs computations to process data required during the loop execution.

The set of configuration bits may include a plurality of configuration bits which define a type of computations carried out by the plurality of data processing cells, and a path of data processed by the plurality of data processing cells.

A data processing method of a data processing system in which a loop accelerator executing a loop of a program shares data used during a program execution through a central register file by configuring a process core executing the program and an array consisting of plurality of data processing cells according to a set of configuration bits. The method includes configuring the array to fetch data for the loop execution from the central register file and fetching the data; configuring the array to execute the loop using the fetched data and executing the loop; and configuring the array to write data which is obtained through the loop execution to the central register file and writing the data to the central register file.

In configuring of the array and the executing of the loop, the array may be configured not to perform data exchange between the central register file and the loop accelerator.

The loop accelerator may release the central register file from the processor core in the configuring of the array and the executing of the loop.

The configuring of the array to fetch data and the fetching of the data may include transferring data for the loop execution from the central register file to a distributed register file of the data processing cells, the distributed register file requiring the data, and then storing the transferred data in the distributed register file.

The configuring of the array to write data and the writing of the data to the central register file may include transferring data required by the processor core, among data stored in the distributed register file of the data processing cells, according to a result of the loop execution, to the central register file and storing the transferred data in the central register file.

BRIEF DESCRIPTION OF THE DRAWING FIGURES

These and/or other aspects of the present invention will become apparent and more readily appreciated from the following description of exemplary embodiments, taken in conjunction with the accompanying drawing figures, in which.

DETAILED DESCRIPTION OF THE EXEMPLARY EMBODIMENTS

Figure 1:
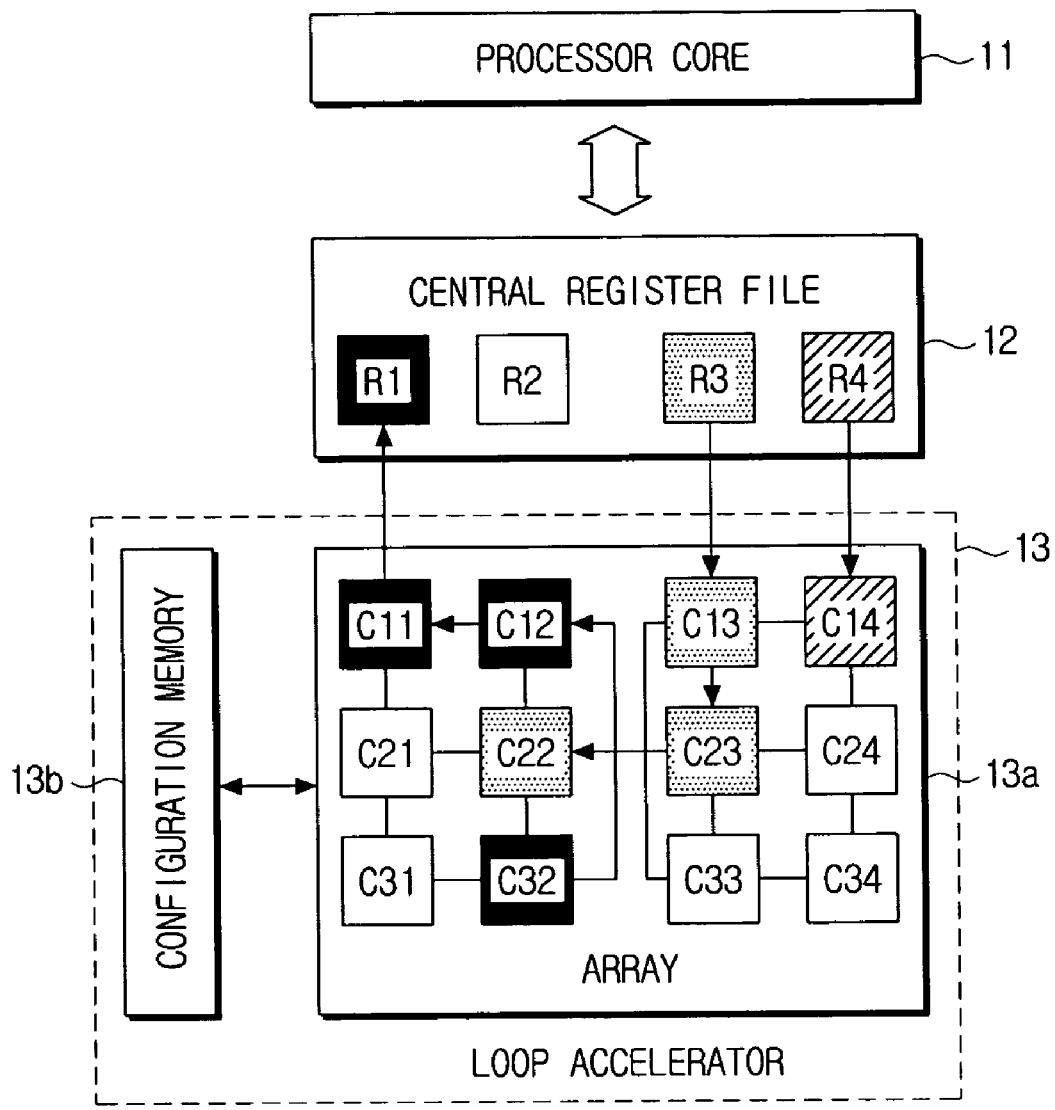
FIG. 1 is a diagram illustrating a conventional data processing system.

Certain exemplary embodiments of the present invention will now be described in greater detail with reference to the accompanying drawings.

In the following description, same drawing reference numerals are used to denote analogous elements in different drawings. The matters defined in the description, such as detailed construction and element descriptions, are provided to assist in a comprehensive understanding of the invention. Also, well-known functions or constructions are not described in detail since they would obscure the invention in unnecessary detail.

Figure 2A:
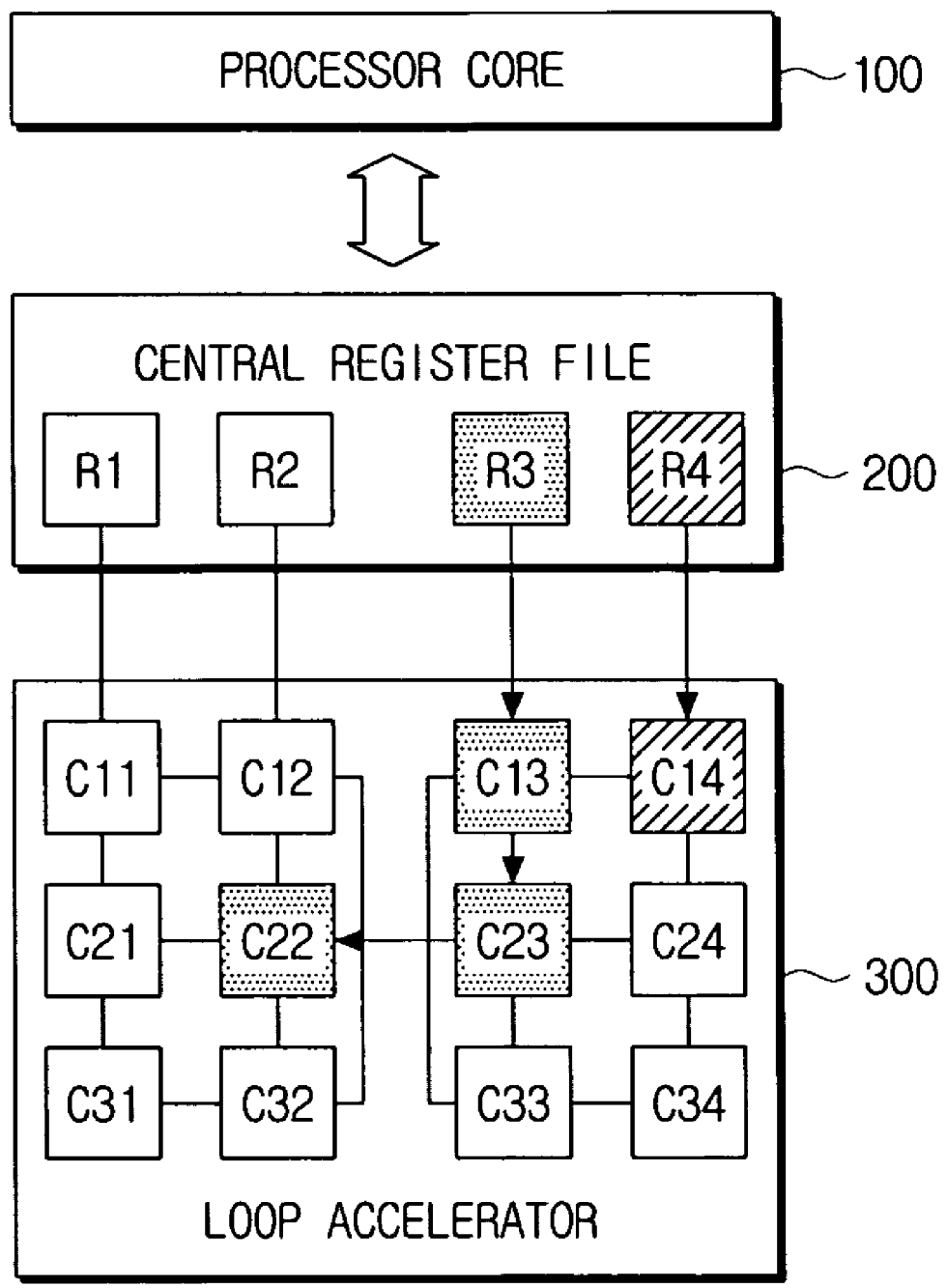
FIGS. 2A through 2C are diagrams illustrating a configuration of a loop accelerator, which is divided into at least three phases based on data exchange during the loop execution in a data processing system according to an exemplary embodiment of the present invention.
Figure 2B:
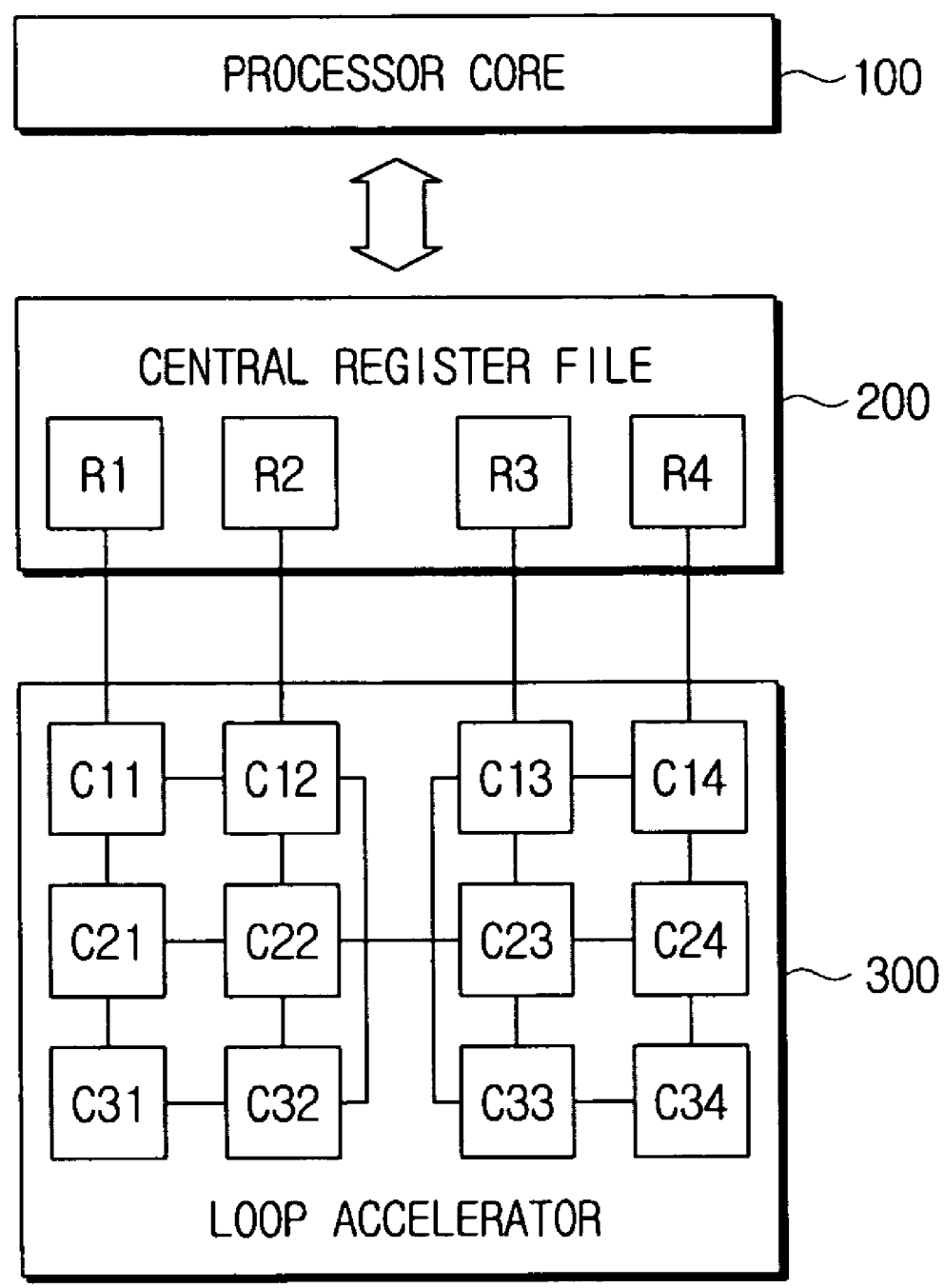
Figure 2C:
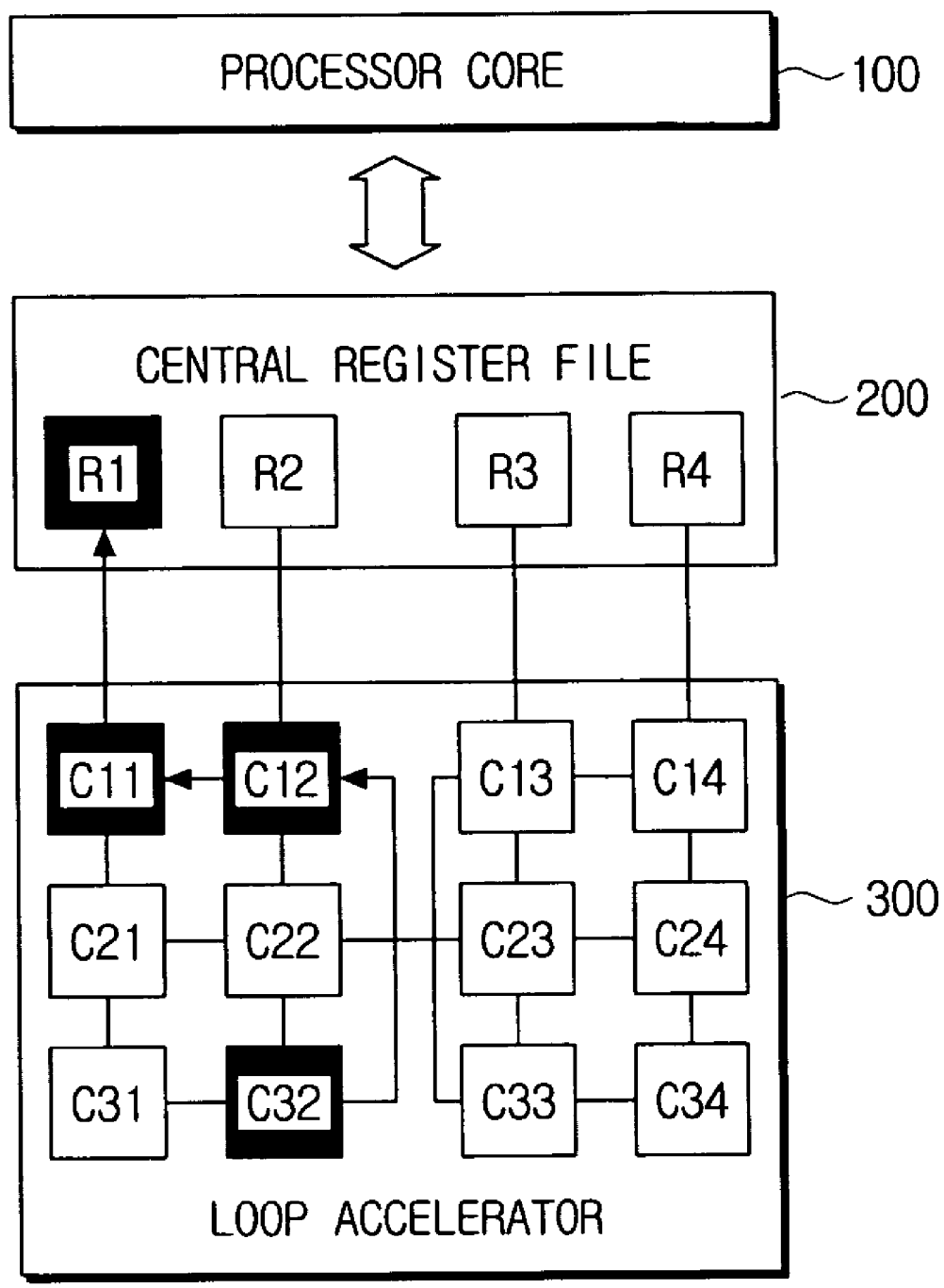

Operation of a data processing system according to an exemplary embodiment of the present invention is described below with reference to FIGS. 2A through 2C. FIGS. 2A through 2C illustrate a configuration of a loop accelerator, which is divided into at least three phases based on data exchange during the loop execution in the data processing system according to an exemplary embodiment of the present invention.

A loop executed by the loop accelerator 300 can be divided into at least three phases. The first phase is an initialization phase, as shown in FIG. 2A, in which data required for the loop execution, such as a live-in value and a loop invariant value, is delivered from registers R3 and R4 of a central register file 200 to data processing cells C22 and C14, which require the data in the loop accelerator 300.

The second phase is a kernel phase, as shown in FIG. 2B, in which the loop is executed at the loop accelerator 300 without data exchange between the central register file 200 and the loop accelerator 300. The kernel phase occupies the majority of the loop.

The third phase is a finalization phase, as shown in FIG. 2C, in which resultant data of the loop execution at the loop accelerator 300. That is, a live-out value is transferred from a data processing cell C32 to a register R1 of the central register file 200 via cells C12 and C11.

During the initialization phase of the loop execution, it is not necessary to occupy the data processing cells C11 and C12 as the routing resource for the sake of the data transfer from the loop accelerator 300 to the central register file 200. During the kernel phase, it is possible to use all of the data processing cells C11, C12, C13, C14, C22, C23 and C32, which are used for the data exchange between the loop accelerator 300 and the central register file 200, for other tasks.

Likewise, during the finalization phase, it is possible to use the data processing cells C13, C14, C22, and C23 (that were used as the routing resource to receive data from the central register file 200 to the loop accelerator 300) for other tasks. Accordingly, if the configuration of the loop accelerator 300 is differentiated according to the initialization, the kernel, and the finalization phases, the data processing cells can be far more efficiently utilized during the loop execution. Particularly, the loop accelerator 300 does not have to occupy the routing resource unnecessarily during the kernel phase which takes up the majority of the loop.

Hereafter, the data processing system, according to an exemplary embodiment of the present invention, operating as described in FIGS. 2A through 2C, is explained in detail with reference to FIG. 3.

Figure 3:
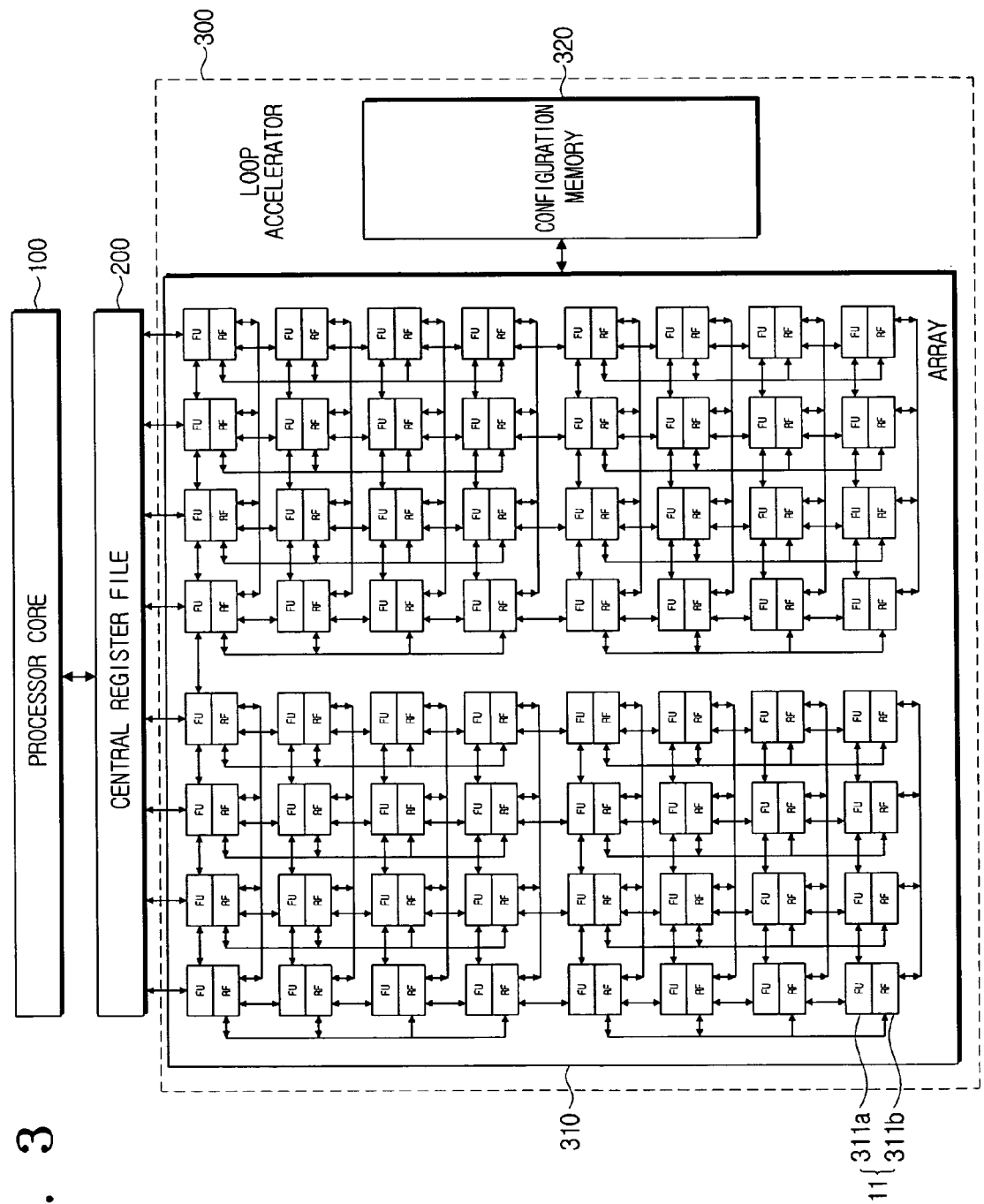
FIG. 3 is a block diagram of the data processing system according to an exemplary embodiment of the present invention.

Referring now to FIG. 3, the data processing system includes a processor core 100, a central register file 200 and a loop accelerator 300. The loop accelerator 300 includes an array 310 consisting of a plurality of data processing cells 311, and a configuration memory 320. The data processing cell 311 includes a function unit 311a and a distributed register file 311b.

The processor core 100 is responsible for executing a program by fetching instructions and data of the program stored in a memory (not shown) from a cache (not shown). Primary, the processor core 100 executes other tasks than the loop in the program.

With respect to the loop during the program execution, the processor core 100 executes an instruction which directs the processor core 100 to load data required to execute the loop, for example, a live-in value or a loop invariant value to the central register file 200 so that the value required for the loop execution can be delivered to the data processing cells 311 of the loop accelerator 300.

After loading the required value for the loop execution to the central register file 200, the processor core 100 executes an instruction which directs to commence the loop execution by the loop accelerator 300. At this time, the instruction to commence the loop execution directs the configuration memory 320 to select and apply to the array 310 a set of configuration bits which configures the array 310 such that the loop accelerator 300 can fetch the live-in value or the loop invariant value from the central register file 200 to the distributed register file 311b of the data processing cell 311, which requires the fetched value.

The processor core 100 can continue to execute subsequent tasks of the program by receiving the live-out value which is acquired through the loop execution at the loop accelerator 300, via the central register file 200. Also, the processor core 100 can process other tasks at the same time by releasing the central register file 200 from the loop accelerator 300 during the loop execution.

The loop accelerator 300 executes a loop in the program which is executed by the processor core 100 by configuring the array 310 according to the set of configuration bits stored in the configuration memory 320.

Particularly, in an exemplary embodiment of the present invention, the loop accelerator 300 may alter the configuration of the array into at least three phases based on whether data exchange is carried out with the central register file 200 during the loop execution. As described earlier, the three phases are the initialization phase, the kernel phase, and the finalization phase. In the initialization phase, the loop accelerator 300 fetches data for the loop execution from the central register file 200. In the kernel phase, the loop accelerator 300 executes a loop without exchanging data with the central register file 200. In the finalization phase, the loop accelerator 300 writes the data produced during the loop execution to the central register file 200.

The set of configuration bits contains information relating to a type of computations to be executed by the function unit 311a of each data processing cell 311, and a path of data processed by each data processing cells 311. The set of configuration bits is pre-stored in the configuration memory 320 by a developer or user, or is fetched and stored from a memory (not shown) during the program execution.

The configuration memory 320 can store: a first set of configuration bits, which configures the array 310 to execute the initialization phase; a second set of configuration bits, which configures the array 310 to execute the kernel phase; and a third set of configuration bits, which configures the array 310 to execute the finalization phase.

The array 310 consists of a plurality of data processing cells 311. The array 310 executes a loop by configuring the plurality of data processing cells 311 according to a selected set of configuration bits among the sets of configuration bits stored in the configuration memory 320.

The data processing cell 311 includes a function unit 311a and a distributed register file 311b. The function unit 311a performs a data processing function defined by the set of configuration bits. To this end, the function unit 311a may be provided with an arithmetic and logic unit, commonly known as an ALU (not shown). The distributed register file 311b temporarily stores data required or processed by the function unit 311a.

The loop accelerator 300 configures the array 310 so as to execute the kernel phase. When a loop termination condition is satisfied during the loop execution, the loop accelerator 300 reconfigures the array 310 to execute the finalization phase by applying the third set of configuration bits stored in the configuration memory 320. Thus, the live-out value obtained through the loop execution is transferred from the data processing cell 311 to the central register file 200.

Preferably, but not necessarily, the loop accelerator 300 allows the processor core 100 to use the central register file 200 by releasing the central register file 200 during the kernel phase since the data exchange with the central register file 200 is not performed during this kernel phase.

Figure 4:
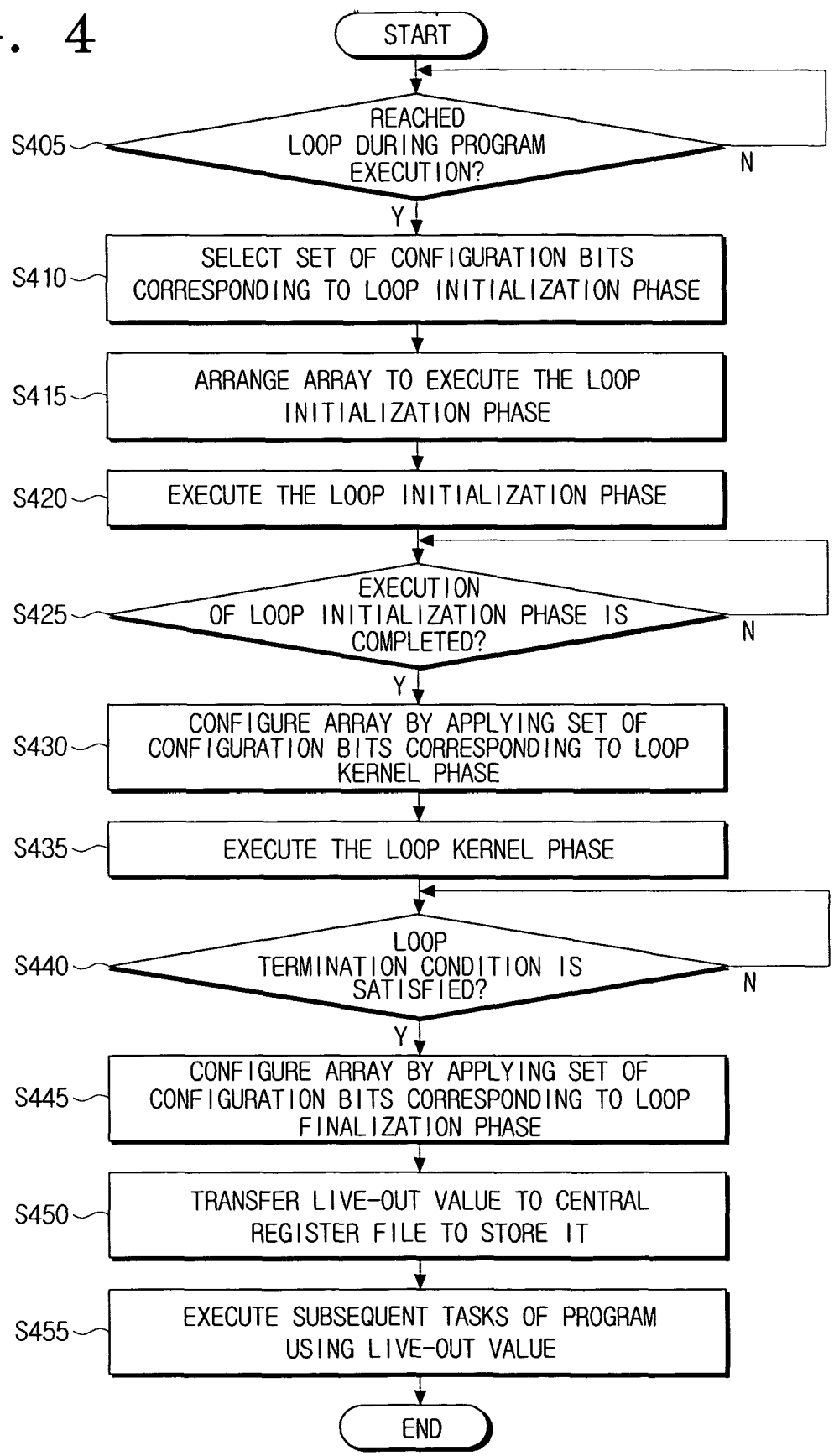
FIG. 4 is a flowchart outlining a data processing method according to an exemplary embodiment of the present invention.

FIG. 4 is a flowchart outlining a data processing method of the data processing system according to an exemplary embodiment of the present invention.

Referring to FIG. 4, when the loop is attained during the program execution (in operation S405-Y), the processor core 100 controls to select a set of configuration bits corresponding to the initialization phase among the sets of configuration bits stored in the configuration memory 320 and controls to apply the selected set of configuration bits to the array 310 of the loop accelerator 300 (in operation S410).

The loop accelerator 300 configures the array 310 according to the set of configuration bits selected at operation S410 so as to execute the initialization phase (in operation S415).

Next, the loop accelerator 300 fetches a live-in value or a loop invariant value which is required data for the loop execution, from the central register file 200 and stores the fetched value in the distributed register file 311b of the data processing cell 311 (in operation S420).

When the execution of the initialization phase is completed (in operation S425-Y), the loop accelerator 300 reconfigures the array 310 by applying a set of configuration bits corresponding to the kernel phase among the sets of configuration bits stored in the configuration memory 320 (in operation S430).

The loop accelerator 300 executes the loop until the loop tension condition is satisfied using the data fetched at operation S420 (in operation S435). In operation S435, since the array 310 is configured to execute the loop without the data exchange between the loop accelerator 300 and the central register file 200, the data processing cell 311 can be used only for the loop execution without being occupied as the routing resource, as set forth earlier. In an exemplary embodiment, preferably, the loop accelerator 300 releases the central register file 200 from the processor core 100 so that the processor core 100 can process other tasks of the program in parallel by use of the central register file 200.

Next, when the loop termination condition is satisfied (in operation S440-Y), the loop accelerator 300 reconfigures the array 310 by applying a set of configuration bits corresponding to the finalization phase among the sets of configuration bits stored in the configuration memory 320 (in operation S445).

The loop accelerator 300 controls to transfer the live-out value, which is produced from the loop execution, from the distributed register file 311b of the data processing cell 311 to the centralized register file 200, and to store the transferred data therein, and notifies the processor core 100 of the completion of the loop execution (in operation S450).

Next, the processor core 100 accomplishes subsequent tasks of the program using the live-out value (in operation S455).

As set forth above, exemplary, non-limiting embodiments of the present invention can avoid unnecessary occupation of the routing resource, which is used for the data exchange between the loop accelerator and the central register file, during the loop execution.

Furthermore, in exemplary, non-limiting embodiments of the present invention, the data processing cells of the loop accelerator can be more efficiently utilized, and thus the loop accelerator can process more of various kinds of applications.

While the exemplary embodiments of the present invention have been particularly shown and described with reference to the accompanying drawings, it will be understood by those skilled in the art that various changes in form and details may be made therein without departing from the spirit and scope of the invention as defined by the appended claims. It will be understood that the particular method and the structure embodying the invention is shown by way of illustration only and not as a limitation of the invention. The principles and features of this invention may be employed in varied and numerous embodiments without departing from the scope of the invention.

What is claimed is:

1. A data processing system comprising:
a processor core which executes a program;

a loop accelerator comprising an array having a plurality of data processing cells, wherein the loop accelerator executes a loop in a program by configuring the array according to a set of configuration bits; and a centralized register file which allows data used in the program execution to be shared by the processor core and the loop accelerator, wherein the loop accelerator divides the configuration of the array in a single iteration of the loop into at least three phases according to whether data exchange with the central register file is conducted during the loop execution, wherein the at least three phases comprise a first phase which fetches data for the loop execution from the central register file, a second phase which executes the loop using the data, and a third phase which writes data obtained through the loop execution to the central register file, and wherein the loop accelerator releases the central register file from the processor core during the second phase, wherein at least some data processing cells of the plurality of data processing cells which are used to fetch data for the loop execution from the central file register in the first phase, are used to execute the loop in the second phase; and wherein the loop accelerator comprises a configuration memory which stores at least three sets of configuration bits for configuring the array according to the at least three phases.

2. The data processing system of claim 1, wherein the at least three sets of configuration bits comprise a first set of configuration bits for configuring the array to execute the first phase, a second set of configuration bits for configuring the array to execute the second phase, and a third set of configuration bits for configuring the array to execute the third phase.

3. The data processing system of claim 1, wherein each of the plurality of data processing cells comprises:

a distributed register file which stores data used during the loop execution; and a function unit which performs computations to process required data during the loop execution.

4. The data processing system of claim 3, wherein the set of configuration bits comprises a plurality of configuration bits which define a type of computations carried out by the plurality of data processing cells and a path of data processed by the plurality of data processing cells.

5. The data processing system of claim 1, wherein, in the second phase, the loop accelerator releases the central register file from the loop accelerator and the loop accelerator releases all of the data processing cells of the array used to fetch the data in the first phase.

6. The data processing system of claim 1, wherein the configuration bits contain information relating to a type of computations to be executed by the plurality of data processing cells, and a path of data processed by the data processing cells.

7. A data processing method of a data processing system in which a loop accelerator executing a loop of a program and in which the data processing system shares data used during a program execution through a central register file by configuring a process core executing the program and an array with a plurality of data processing cells according to a set of configuration bits, the method, for a single iteration of the loop, comprising:

configuring the array to fetch data for the loop execution from the central register file;

fetching the data by the array from the central register file;

configuring the array to execute the loop using the fetched data;

executing the loop by the array using the fetched data;

configuring the array to write data which is obtained through the loop execution to the central register file; and writing, by the array, the data obtained through the loop execution to the central register file, wherein, in the configuring of the array and in the executing of the loop, the array is configured not to perform data exchange between the central register file and the loop accelerator, and wherein the loop accelerator releases the central register file from the processor core during the configuring of the array and the executing of the loop, wherein at least some data processing cells of the plurality of data processing cells which are used to fetch data for the loop execution from the central file register in the first phase, are used to execute the loop in the second phase; and wherein the loop accelerator comprises a configuration memory which stores at least three sets of configuration bits for configuring the array according to the at least three phases.

8. The data processing method of claim 7, wherein the configuring of the array to fetch the data and fetching the data comprises:

transferring data for the loop execution from the central register file to a distributed register file of the data processing cells, the distributed register file requiring the data, and storing the transferred data in the distributed register file.

9. The data processing method of claim 7, wherein the configuring of the array and the writing of the data to the central register file comprises:

transferring data, required by the processor core among data stored in the distributed register file of the data processing cells, according to a result of the loop execution, to the central register file, and storing the transferred data in the central register file.

10. The data processing method of claim 7, wherein the configuration bits contain information relating to a type of computations to be executed by the plurality of data processing cells, and a path of data processed by the data processing cells.

* * * * *